UNITED STATES PATENT OFFICE.

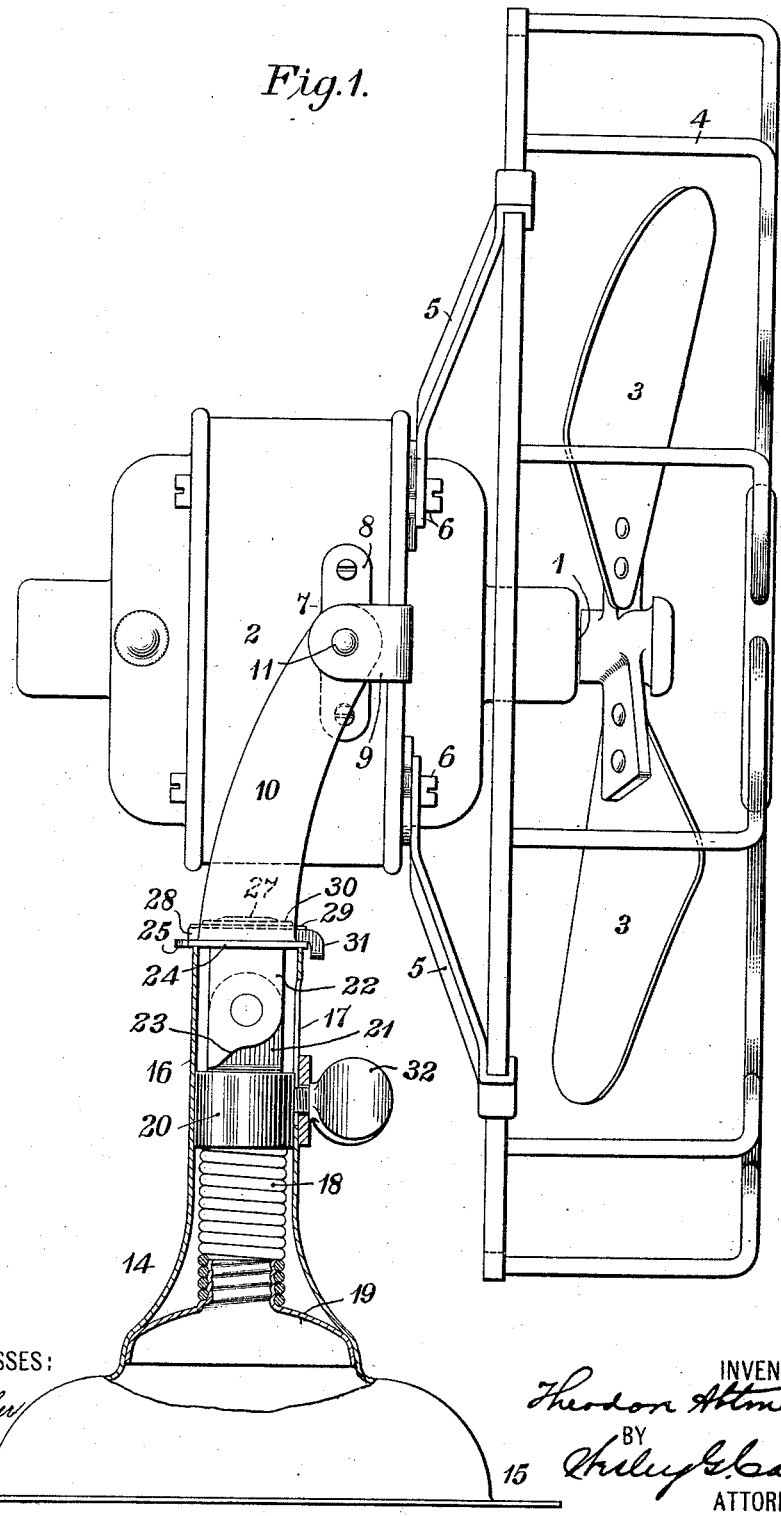

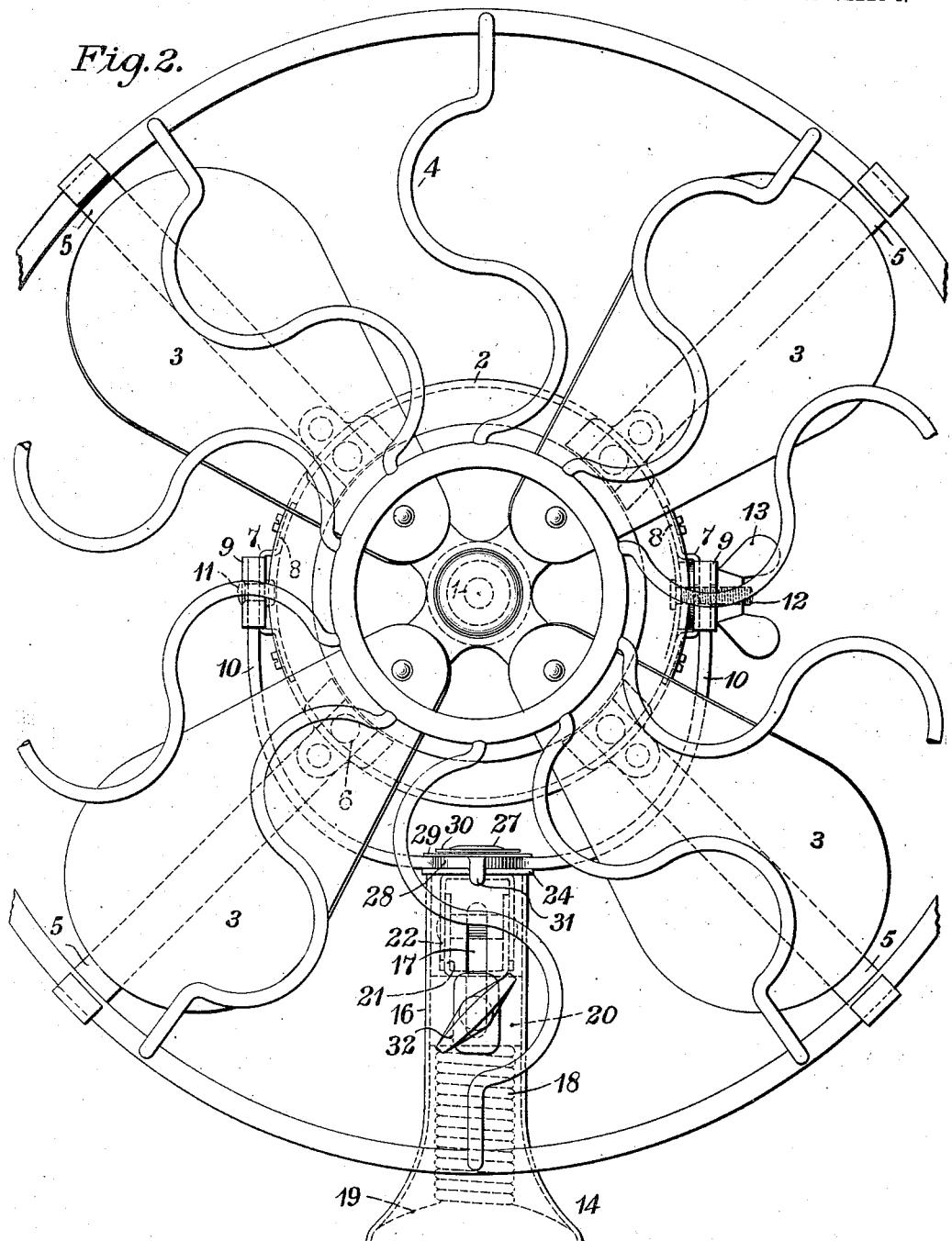

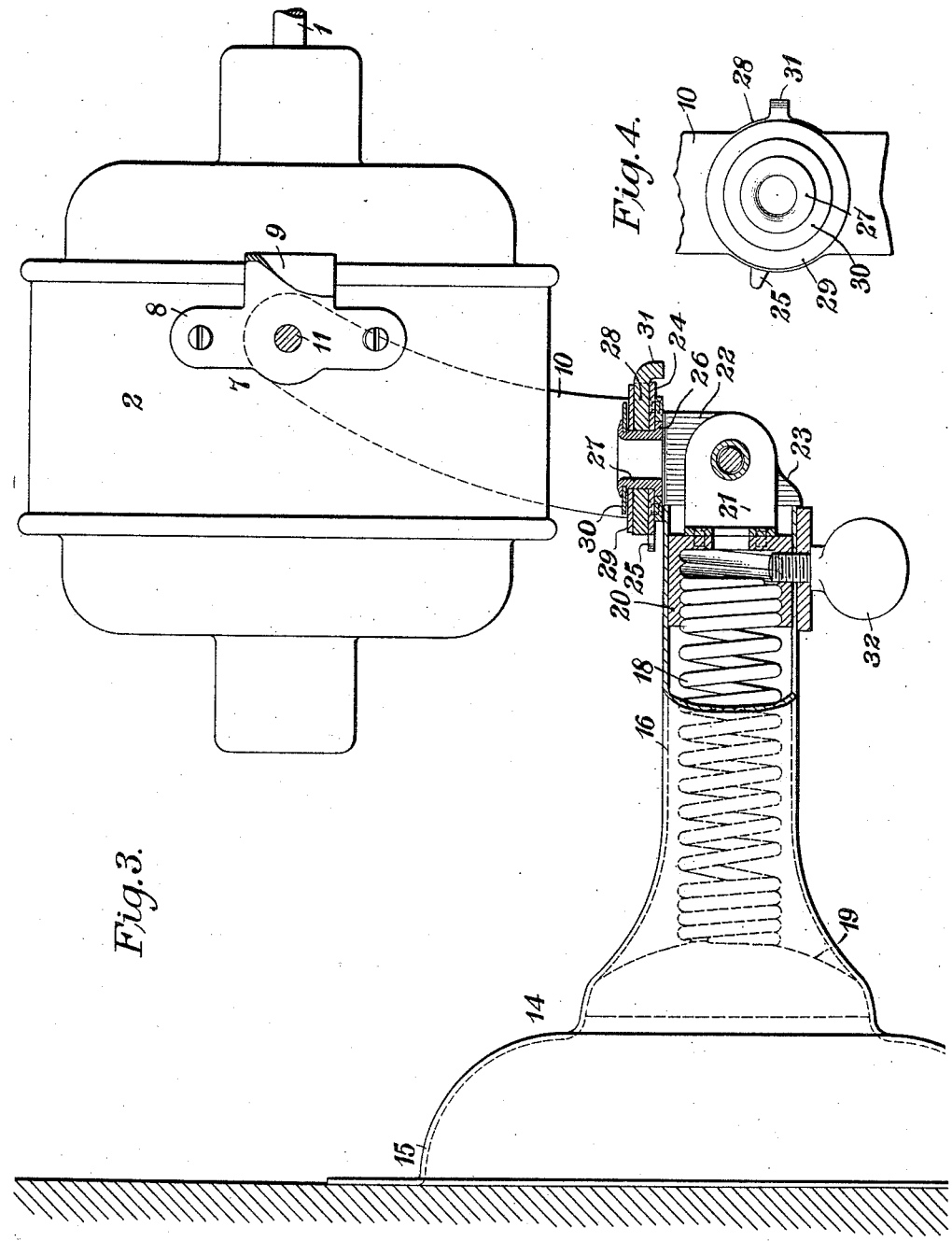

THEODORE ABTMEYER, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-DRIVEN FAN.

1,018,543.  Specification of Letters Patent.  Patented Feb. 27, 1912.

Application filed June 17, 1910. Serial No. 567,475.

*To all whom it may concern:*

Be it known that I, THEODORE ABTMEYER, a citizen of the United States, and a resident of Wilkinsburg, in the county of Allegheny and State of Pennsylvania, have invented a new and useful Improvement in Motor-Driven Fans, of which the following is a specification.

My invention relates to motor driven fans and it has for its object to provide a simple and effective means for adjusting the fan and its driving motor with reference to the base in such manner that the adjusted parts shall be securely clamped in position and the base be mounted either upon a horizontal, a vertical or an inclined support.

In the accompanying drawings, Figure 1 is a view, mainly in side elevation but partially in section, of a motor-driven fan embodying my invention. Fig. 2 is a view, in front elevation, of the structure shown in Fig. 1. Fig. 3 is a view, mainly in side elevation but partially in section, of the motor and base shown in Figs. 1 and 2 when adjusted for mounting upon a vertical support, and Fig. 4 is a detail view of certain parts of the adjusting mechanism.

Referring now to the structural details illustrated in the drawings, one end of the shaft 1 of an electric motor 2 is provided with fan blades 3 which are inclosed within a skeleton guard frame 4, of usual construction, the supporting arms 5 of which are fastened to the front end of the frame of the motor 2 by means of screws 6.

Brackets 7, which are fastened to the respective sides of the motor frame, severally comprise a base portion 8 and a portion 9 which is bent into substantially U shape in order to receive one end of a U shaped supporting bar 10. One end of the bar 10 is fastened between the corresponding parts 8 and 9 by means of a rivet 11 and the other end is fastened between the corresponding parts 8 and 9 of the other device 7 by means of a bolt 12 and a thumb nut 13 in order that the motor may be clamped in any position to which it may be adjusted on the parts 11 and 12 as trunnions.

The base 14 of the fan structure comprises a broad outer portion 15 which is adapted to either rest upon a horizontal support or be fastened by suitable means to a vertical or inclined support and a cylindrical extension 16 having a longitudinal slot 17 in one side. Located within the portion 16 of the base is a helical spring 18, the outer end of which is securely fastened to a part 19 which anchors it to the base and the inner end of which is securely seated in a block 20 of such form and dimensions as to fit within the extension 16 and slide freely therein. Riveted to the inner end of the block 20 is a sheet metal part 21 of U shape and pivotally attached to the sides of the part 21 is an inverted U shaped member 22, the outer ends of which are cut away to provide curved edges 23 at one side. The inner end of the member 22 is riveted to a substantially circular plate 24 having a projection 25 at one side. Located beneath the plate 24 and in a circular opening in the adjacent end of the member 22 is a flange 26 of a thimble 27 which projects through an opening in the base portion 28 of the bar 10. Washers 29 and 30 are interposed between the base portion 28 of the bar 10 and the upset end of the thimble 27, a pivotal structure being thus provided for permitting the motor and its fan to turn upon the base. The portion 28 of the bar 10 is provided with a downwardly projecting finger 31 which is in position to engage the projection 25 when the motor is rotated in order to limit such movement of rotation.

When the parts are in the positions shown in Figs. 1 and 2, the block 20 and the parts attached thereto may be securely clamped in position by means of a thumb screw 32 which projects through the slot 17 in the extension 16, the parts being then in position for the operation of the fan when supported upon a desk, table or other horizontal support.

In case it is desired to mount the fan upon a vertical or an inclined wall or panel, the thumb screw 32 is loosened and the parts 20, 21 and 22 etc. are drawn outwardly through the extension 16 against the tension exerted by the spring 18 until the inner end of the member 22 clears the outer end of the extension 16, when the motor and fan may be turned to the position indicated in Fig. 3 (in which the straight sides of the part 22 rest upon the outer end of the extension 16) and be held securely in that position by the tension of the spring 18. The parts may be restored to the original relations by drawing the movable members outward sufficiently against the tension of the spring 18 to permit the end of the part 22 to clear the end of the part 16. The spring 18 will then serve to draw the parts 21 and 22 into the extension 16.

I claim as my invention:

1. The combination with a hollow base and a fan motor supported thereon, of pivotally connected parts movable into and out of said base, a helical spring having its respective ends fastened to said base and to one of said pivotally connected parts and means for clamping said parts in either of their extreme positions.

2. The combination with a hollow base, a block located and longitudinally movable in said base, and a spring fastened at its respective ends to said base and to said movable block, a fan motor having a hinge or pivotal connection to said block, and means for clamping said block in either of its extreme positions.

3. The combination with a hollow base, a helical spring located within and having one end anchored to said base, and a longitudinally movable block fastened to the other end of said spring, of a fan motor having a hinge or pivotal connection to the said block which is operative only when the spring is distended, and means for clamping said block in either of its extreme positions.

4. The combination with a hollow base, a helical spring located within and having one end anchored to said base and a movable block fastened to the other end of said spring, of a fan motor, a trunnion frame for said motor, a pivotal support for said trunnion frame and means for effecting a hinge connection between said support and said movable block.

In testimony whereof, I have hereunto subscribed my name this 27th day of May, 1910.

THEODORE ABTMEYER.

Witnesses:
J. R. BACKOFEN,
B. B. HINES.

---

Copies of this patent may be obtained for five cents each, by addressing the "Commissioner of Patents, Washington, D. C."